(12) United States Patent
Schilling et al.

(10) Patent No.: US 7,931,467 B2
(45) Date of Patent: Apr. 26, 2011

(54) METHOD FOR DETERMINING AN AIR RATIO IN A BURNER FOR A FUEL CELL HEATER, A FUEL CELL HEATER

(75) Inventors: Lutz Schilling, Stuttgart (DE); Philipp Klose, Hamburg (DE); Christian Hoffmann, Hamburg (DE)

(73) Assignee: Baxi Innotech GmbH, Hamburg (DE)

( * ) Notice: Subject to any disclaimer, the term of this patent is extended or adjusted under 35 U.S.C. 154(b) by 868 days.

(21) Appl. No.: 11/721,214

(22) PCT Filed: Dec. 8, 2005

(86) PCT No.: PCT/EP2005/013175
§ 371 (c)(1),
(2), (4) Date: Oct. 9, 2007

(87) PCT Pub. No.: WO2006/061228
PCT Pub. Date: Jun. 15, 2006

(65) Prior Publication Data
US 2009/0130616 A1    May 21, 2009

(30) Foreign Application Priority Data

Dec. 10, 2004  (DE) .................. 10 2004 059 494

(51) Int. Cl.
F23N 1/02        (2006.01)

(52) U.S. Cl. .................... 431/89; 431/75; 73/23.32
(58) Field of Classification Search .............. 431/89, 431/12, 75; 73/23.32
See application file for complete search history.

(56) References Cited

U.S. PATENT DOCUMENTS

| 6,299,433 B1* | 10/2001 | Gauba et al. ............... 431/12 |
| 2007/0275282 A1* | 11/2007 | Veyo et al. ................. 429/26 |

FOREIGN PATENT DOCUMENTS

| DE | 196 18 573 C1 | 6/1997 |
| DE | 199 41 978 A1 | 3/2001 |
| DE | 100 59 892 A1 | 6/2002 |
| DE | 102 13 326 A1 | 10/2003 |
| DE | 103 24 315 A1 | 12/2004 |
| EP | 0 922 666 A1 | 1/1998 |
| EP | 1 094 031 A1 | 10/2000 |

* cited by examiner

*Primary Examiner* — Alfred Basichas
(74) *Attorney, Agent, or Firm* — Vidas, Arrett & Steinkraus

(57) ABSTRACT

A method for determining an air ratio in a burner for a fuel cell heater having an ionization sensor in the range of the flame and which is fed with two different gases for combustion, one of said gases being obtained from a gas treatment, wherein a measurement signal of the ionization sensor is converted into an actual value for the air ratio depending on one or more variable of states of the gas treatment.

6 Claims, 3 Drawing Sheets

METHOD FOR DETERMINING AN AIR RATIO IN A BURNER FOR A FUEL CELL HEATER, A FUEL CELL HEATER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for determining an air ratio in a burner for a fuel cell heater as well as a fuel cell heater.

Fuel cells, such as polymer membrane fuel cells for example, are sufficiently known. Fuel cell heaters for decentralized energy supply are fed with natural gas through a gas supply connection, wherein hydrogen is reformed from hydrogenous compounds of the natural gas. In the presence of a catalyst in a reformer, the hydrocarbons (CnHm) of the natural gas undergo endothermic reform by the addition of water vapor, wherein carbon dioxide (CO2) and hydrogen (H2) form.

The reformate also contains residues of carbon monoxide (CO), which are selectively oxidized exothermically in a downstream gas purification by the addition of oxygen (O2). This forms carbon dioxide (CO2) and water (H2O). A gas burner is used for the endothermic steam reformation.

Such reformers are described for example in EP 0 922 666 B1, DE 102 13 326 A1 and EP 1 094 031, the entire contents of all of these listed references are incorporated herein by reference.

A method and a device for operating a gas burner are known from DE 196 18 573 C1, the entire contents of which is incorporated herein by reference, in which the fuel/air ratio, termed a lambda value, is maintained within a pre-defined interval. To regulate the air ratio, an ionization electrode, arranged in the burner's flame range, is connected to an evaluation circuit for a current flowing between the burner and the ionization electrode. The evaluation circuit generates an ionization voltage from an ionization current depending on the combustion which is supplied to a regulator circuit. In regulating the fuel and/or air volume flow in the burner, the ionization voltage is then depending on whether a high-caloric gas or a lower-caloric gas is burned.

An air ratio controller for a burner is known from EP 1 186 831 B1, the entire contents of which is incorporated herein by reference, in which a sensor determines the quality of the combustion. A sensor evaluating device produces a sensor signal supplied to a control unit. The control unit stores characteristic data on the behavior of the actuators. When the ionization signal is not representative of the combustion during the starting operation of the burner or for other reasons, the air/fuel ratio is not regulated but instead controlled. Following a pre-purge period, a notional actuating signal is produced so as to approach the optimally-regulated value as quickly as possible.

The invention is based on the object of providing a method for determining an air ratio in a burner for a fuel cell heater which also allows reliable control of a burner in a fuel cell heater during the starting phase of the system and upon changes in the gas composition.

BRIEF SUMMARY OF THE INVENTION

The method according to the invention relates to determining the air ratio in a burner for a fuel cell heater. An ionization sensor is provided in the flame range of the burner and is fed by at least two different gases. One of these gases is fed to the burner from a gas treatment and its composition changes over time, for example during a starting sequence of the device. A measurement signal of the ionization sensor is converted into an actual value for the air ratio contingent upon one or more of the gas treatment variables of state. The variable gas comes essentially from the gas treatment. The invention is based on the realization that, given the appropriate consideration of at least one further variable of state of the gas treatment, the signals received with an ionization electrode furnish reliable and reproducible signals for the actual value of the air ratio, even in the case of a variable gas mixture. Unlike the known burners with ionization sensors, in the method according to the invention, an evaluation of the measurement signal takes place in order to obtain an actual value for the current air ratio in a variable gas mixture. The actual value of the air ratio thus determined is preferably relayed to a regulator for the air/fuel mixture in the burner.

The composition of the variable gas from the gas treatment is considered as a variable of state in determining the actual value of the air ratio, in particular the methane content of the gas. In a preferred design, the methane content is determined in the method according to the invention depending on the temperature of a reformer. As a result, the method according to the invention thus leads to being able to reliably determine an actual lambda value from the measurement signal of the ionization sensor and a temperature value for the reformer. Likewise suited to be considered as a further variable of state of the gas treatment for determining the actual value of the air ratio is the N2 content from the gas purification as well as the expected volume of combustion gas or the hydrogen conversion in the fuel cell(s).

The present object is likewise solved by a fuel cell heater with a burner having an ionization sensor in the range of the flame. The burner is fed with two different gases, wherein one of these gases comes from the gas treatment and has a variable composition. A signal evaluation unit evaluates the measurement signal of the ionization sensor and ascertains an actual value for the air ratio, wherein signals are provided signal evaluation unit for the magnitudes of one or a plurality of variable of states for the gas treatment. The fuel cell heater according to the invention allows the ionization sensor in the burner, which can also be used to monitor the flame, for example, to be used as a sensor for the actual value of the air ratio. A reliable actual value determination of the air ratio is thus provided without the need for oxygen sensors in the exhaust gas channel, temperature sensors on the burner surface or complex UV sensors in the combustion chamber, for example.

In a preferred development, the fuel cell heater is provided with a regulating unit which adjusts the volume of air and/or the volume of gas fed for combustion depending on the actual value determined for the air ratio.

In a preferred further development, at least one temperature sensor is provided in a reformer of the fuel cell heater for determining methane content in the variable gas. The magnitude of the temperature value is provided to the signal evaluation unit as an input signal so that the temperature value and the methane content in the gas derived therefrom can be taken into account when evaluating the measurement signals of the ionization sensor.

Characteristic maps for the air ratio depending on the measurement signal of the ionization sensor for burner operation under different loads are appropriately stored in the signal evaluation unit. Alternatively or additionally, characteristic maps can likewise be provided for different hydrogen volumes in the fuel cell(s). It is also expedient to provide characteristic maps in the signal evaluation unit for the air ratio depending on the measurement signal of the ionization sensor for the different types of combustion gas utilized, natural gas being advantageously used as combustion gas.

The burner is preferably provided as a duct burner in which the flame passes through a mesh or a metal weave matting respectively, for example. This burner exhibits a large allowable lambda area without any instability to the flame.

BRIEF DESCRIPTION OF THE SEVERAL VIEWS OF THE DRAWINGS

A preferred embodiment of the fuel cell heater will be shown in the following in a simplified block diagram.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
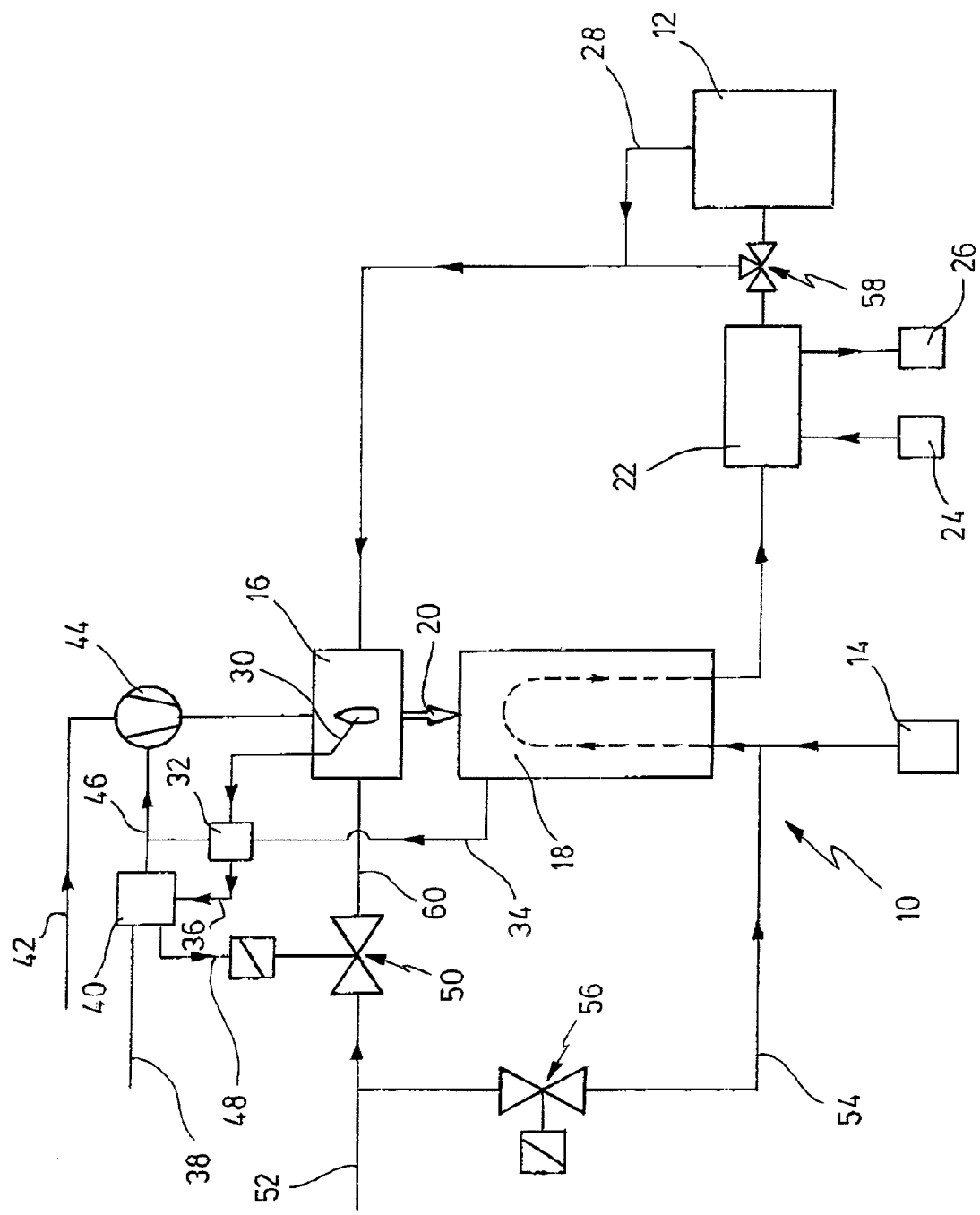
FIG. 1 a schematic block view of the fuel cell heater.

FIG. 1 shows a schematic block view of a fuel cell heater 10 which produces electric current in a fuel cell 12 from H2 conversion. Additional heat is produced during the conversion, which is then available for further utilization. The hydrogen needed for the fuel cell 12 is obtained from natural gas. Natural gas is converted into a hydrogen-rich reformate in a steam reformer by the addition of water 14 in the liquid state at temperatures from 500° C. to 800° C. The hydrogen-rich reformate is usually referred to as gas 2 and has, for example, the following composition:

| Gas components | (%) |
|---|---|
| H2 | 74.81 |
| CH4 | 0.56 |
| C2H6 | 0.00 |
| C3H8 | 0.00 |
| C4H | 100.00 |
| CO | 0.00 |
| CO2 | 19.72 |
| N2 PrOx | 4.91 |
| N2 anode | 0.00 |

A burner 16 is used to provide the process heat in the reformer. This burner can be configured as an integral component of the reformer 18 or as a separate component. FIG. 1 shows the amount of heat 20 conveyed by the burner 16 in the reformer.

Conversion from natural gas into H2 and CO2 during reformation is not absolute, carbon monoxide in fact also forms as intermediate product. Since carbon monoxide is contaminating to the catalyst of the fuel cell 12, the carbon monoxide content is gradually reduced by conversion to carbon dioxide in a plurality of downstream process stages. These process stages are also called shift stages, wherein the CO content can be reduced below 1% by the additional formation of H2. In a gas purification 22, which is also termed selective oxidation (Selox) or preferential oxidation (PrOx), the remaining CO content is reduced to a range harmless for the catalyst, in the range of a few ppm, by adding atmospheric oxygen 24. In the selective oxidation, which occurs at approximately 100° C., water is discharged as a product at 26. The gas quality thus obtained can be added to the fuel cell 12 without the risk of catalyst degradation.

In fuel cells, hydrogen is converted into electric power by the release of heat (not shown). This reaction is also referred to as hydrogen conversion and depends on the engineered design to the fuel cell. The unconverted reformate in the fuel cell exits via line 28 on the anode side of the fuel cell 12. The unconverted reformate is referred to as gas 3 and essentially has the composition as indicated in the following.

| Gas components | (%) |
|---|---|
| H2 | 52.73 |
| CH4 | 0.99 |
| C2H6 | 0.00 |
| C3H8 | 0.00 |
| C4H | 100.00 |
| CO | 0.00 |
| CO2 | 34.76 |
| N2 PrOx | 8.64 |
| N2 anode | 2.88 |

The gas 3 is re-fed to the reformer burner 16 for thermal utilization. The gas channel from a gas supply connection through the reformer, PrOx stage and potentially through the fuel cell is referred to as the gas treatment.

An ionization sensor 30 is provided in the reformer burner 16 which has an ionization electrode in the range of the flame. The ionization current flowing across the electrode 30 is provided to a signal evaluation unit 32. Likewise supplied to the signal evaluation unit is a temperature value 34 measured at the reformer 18. The signal evaluation unit 32 determines an actual lambda value for the air/fuel mixture in burner 16 from the input variables received, of which only the ionization current and the reformer temperature 34 are shown as an example in FIG. 1.

A regulating unit 40 determines reference variables for the air and gas supply from the actual value 36 received and a predefined target value 38 from a control unit (not shown). The air supply ensues through air channel 42, wherein the actuating signal 46 controls a fan 44 in the air channel 42. Another actuating signal 48 controls a valve 50 in the gas feed 52 for the burner 16.

The gas treatment system runs through different operational states. In the system's starting phase, during which the reformer and the shift stages are warmed up, the burner 16 is fed with pure natural gas in order to warm the system up. The warm-up phase is maintained until the reformer 18 has reached a temperature as of which water 14 can be added to the reformer 18 without the risk of condensation.

Once the system's starting phase and the warming up of the reformer are complete, water 14 and process gas are fed to the reformer 18 through gas line 54. The valve 56 is actuated accordingly. The reformate formed in the reformer displaces the inert gas contained within the reformer to that point and feeds the inert gas through the PrOx stage 22 and the three-way valve 58 to the burner 16. The three-way valve 58 is hereby configured such that no gas can enter into the fuel cell 12 but instead the gas displaced from the reformer 18 is fed to the burner 16. A diluting therefore occurs at the burner from the feed of the inert gas which is noted as in the manner of a change in the air ratio.

Supplying the burner with gas 1 through the line 52, the valve 50 and the line 60 continues during the displacement process until the inert gas has been displaced and only reformate is supplied to the burner.

Upon complete displacement of the inert gas, the burner is provided to the reformate. The gas composition thereby depends on the reformer temperature. The burner will be fed with gas 2 until the gas quality reaches a level to be supplied to the fuel cell. This period can last from a few seconds to several minutes, it is however also possible for the reformate to be conducted immediately to the fuel cell.

As soon as the gas 2 attains the necessary quality, the three-way valve 58 is set so as to supply it to the fuel cell 12. For safety reasons, as with the reformer 18, the fuel cell also initially contains inert gas. Same must likewise be displaced by the reformate and is fed to the burner 16 via the line 28. During this displacement, the burner is further fed with gas 1 through the line 52, the valve 50 and the line 60 so as to avoid loss of the flame.

After displacing the inert gas from the fuel cell 12, current can be produced with same by H2 reaction. Since the fuel cell only converts a portion of the H2 into current, gas 3 is provided at the anode. In the normal operational state, the heat requirement of the reformer 18 is met by the gas 3 fed through the line 28 to the burner 16. In this case, the gas supply 50 is then closed. The degree of H2 conversion in the fuel cell is also termed fuel utilization (FU) and is normally in the range of between 60% and 100%. At a certain degree of conversion, the burner 16 still has sufficient gas 3 to meet the heat requirement of the reformer 18. On the other hand, at high hydrogen conversion, the energy content of gas 3 is too low to supply the reformer process with sufficient heat. In this case, additional gas 1 is fed to the burner. In so doing, the reformer temperature can be used as a controlled variable for the additional gas volume of gas 1.

A minimum gas quality must be ensured for the fuel cell to experience smooth operation. Should this value be exceeded, the reformate flow must be cut off from the cell. This change upon exceeding a CO value occurs during the switching time of the corresponding valves, for example 58, thus takes place without transition. In the case of any other temporary disruption such as can occur from load shedding or the like, for example, the entire reformate produced is analogously directed past the fuel cell to the burner.

During the various different operational phases, the reformer burner is fed with different combustion gases which can change suddenly or which are continuously transitive. Likewise, pure natural gas of different qualities can also be fed to the burner such as hydrogen-rich reformate with differing H2CH4, CO2 and N2 contents.

Figure 2:
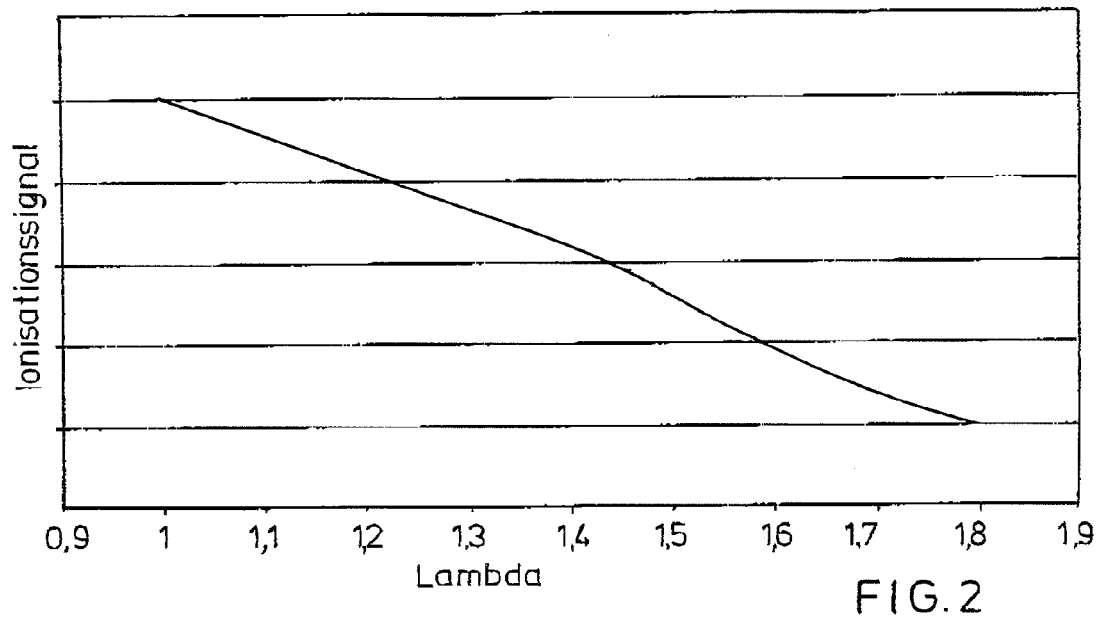
FIG. 2 the ionization signal depending on the air ratio lambda.
Figure 3:
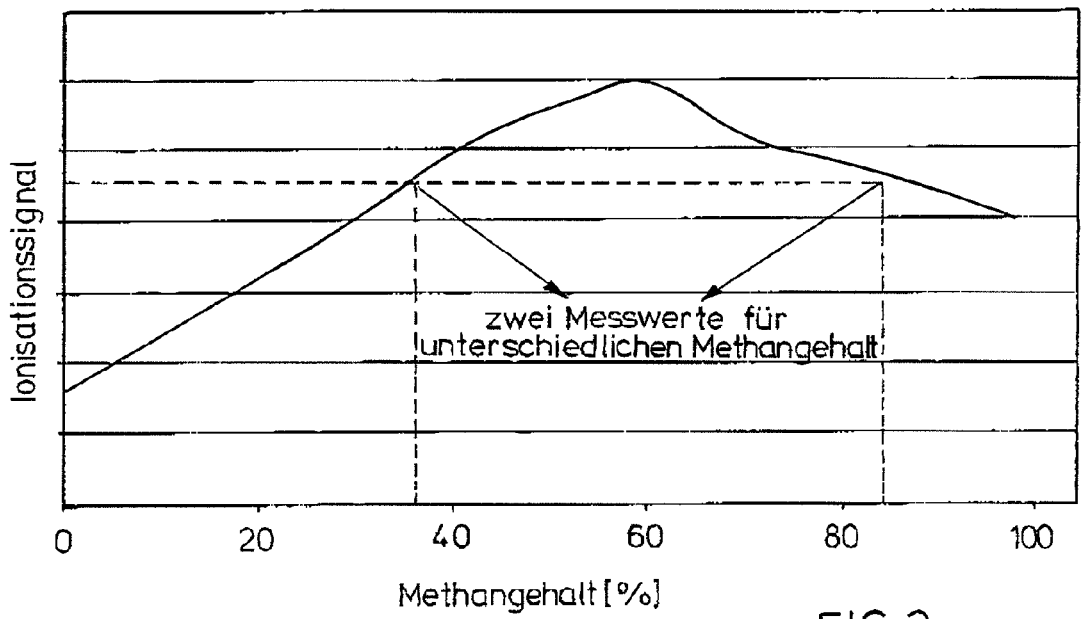
FIG. 3 the ionization signal depending on the methane content.

An air ratio which ensures a complete and clean burn is respectively set for each combustion gas or gas composition fed to the burner. The ionization sensor 30 is used to monitor the air ratio. Its output signal indicates a characteristic change in the air ratio. In pure natural gas operation, there is a simple correlation between the level of the signal and the air ratio, as shown for example in FIG. 2. When using combustion gas of different compositions, the ionization signal additionally changes depending on the methane content. This process prevents the clear defining of a specific lambda value (cf. FIG. 3). The signal can thus exhibit fully identical values at differing load stages and differing methane contents. In order to be able to clearly define the signal, additional boundary conditions are taken into account in accordance with the invention.

The reformer temperature is hereby significantly definitive for the degree of methane conversion. From the degree of conversion, the remaining methane content can be determined inversely such that the dependency of this residual methane content on the reformer temperature allows the air ratio to be explicitly resolved with sufficient accuracy.

For the gas purification of the reformate, atmospheric oxygen 24 is fed to the reformats in selective oxidation 22. The unwanted CO is abreacted with the atmospheric oxygen at a catalyst to H2O 26 and CO2. The reaction educts and the remaining atmospheric nitrogen dilute the reformate whereby, among other things, a proportional residual methane content displacement also ensues. Given exact knowledge of the PrOx air volume, this diluting effect can be taken into account when interpreting the ionization signal.

Figure 4:
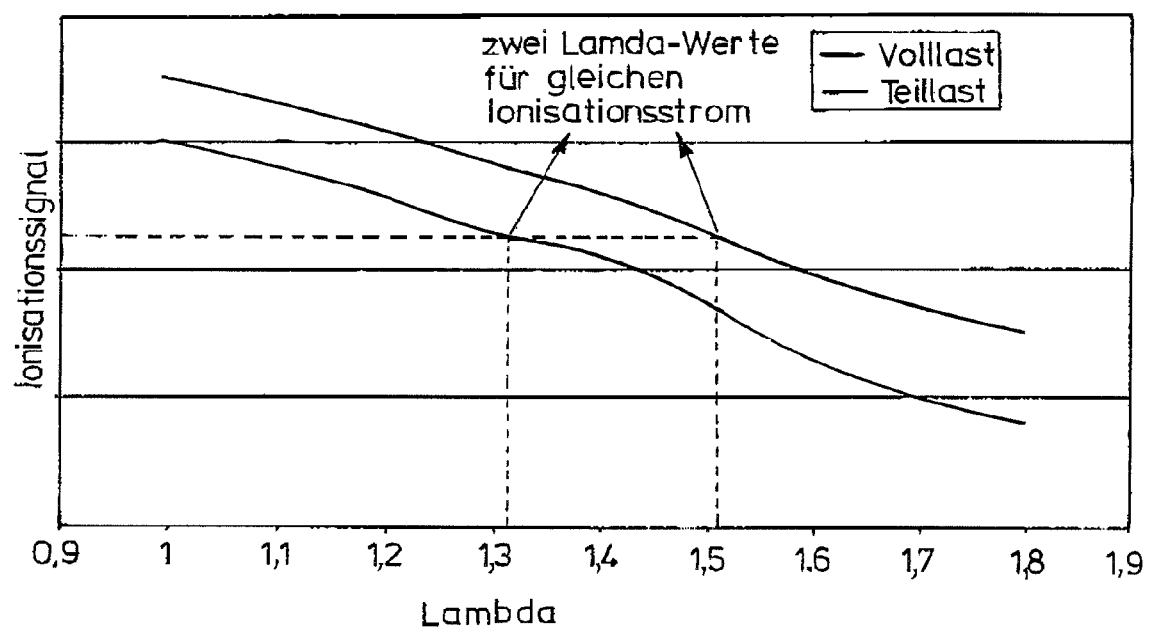
FIG. 4 the ionization current depending on the combustion gas volume.

Apart from the methane percentile in the combustion gas, the absolute combustion gas volume also has an impact on the level of the ionization signal, as shown for example in FIG. 4 for a full-load operation and a partial-load operation of the burner 16. Evaluating the amount of process gas supplied can determine how much reformate is produced. The expected volume of combustion gas can then be calculated from the current produced by the fuel cell combined with the given volume of reformate so that exactly one lambda value can again be explicitly resolved from the ionization signal.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A fuel cell heater with a burner having an ionization sensor (30) in the range of the flame and which is fed with two different gases for combustion, one of said gases coming from a gas treatment, characterized in that a signal evaluation unit (32) is provided which evaluates the measurement signal of the ionization sensor (30) and ascertains an actual value for the air ratio, wherein signals (34) are applied to the signal evaluation unit (32) for one or a plurality of variable/s of states for the gas treatment unit and the measurement signal of the ionization sensor (30) is converted into an actual value for the air ratio depending on one or more variable/s of states of the gas treatment unit, and a regulating unit is provided which adjusts a volume of air and/or a volume of gas supplied for combustion depending on the actual value thus determined for the air ratio, characterized in that characteristic maps for the air ratio depending on the measurement signal of the ionization sensor for different hydrogen conversions in the fuel cell are stored in the evaluation unit (32).

2. The fuel cell heater according to claim 1, characterized in that at least one temperature sensor is provided in a reformer (18) for determining a methane content in the gas from the gas treatment.

3. The fuel cell heater according to claim 1, characterized in that characteristic maps for the air ratio depending on the measurement signal of the ionization sensor for different loads of the burner are stored in the evaluation unit (32).

4. The fuel cell heater according to claim 1, characterized in that characteristic maps for the air ratio depending on the measurement signal of the ionization sensor for differing gas methane contents are stored in the evaluation unit.

5. The fuel cell heater according to claim 1, characterized in that characteristic maps for the air ratio depending on the measurement signal of the ionization sensor depending on the type of natural gas used are stored in the evaluation unit (32).

6. The fuel cell heater according to claim 1, characterized in that a duct burner is provided as the burner.

\* \* \* \* \*